April 6, 1926.
E. F. WESTON
1,579,849
POINTER FOR ELECTRICAL MEASURING INSTRUMENTS
Filed June 26, 1925
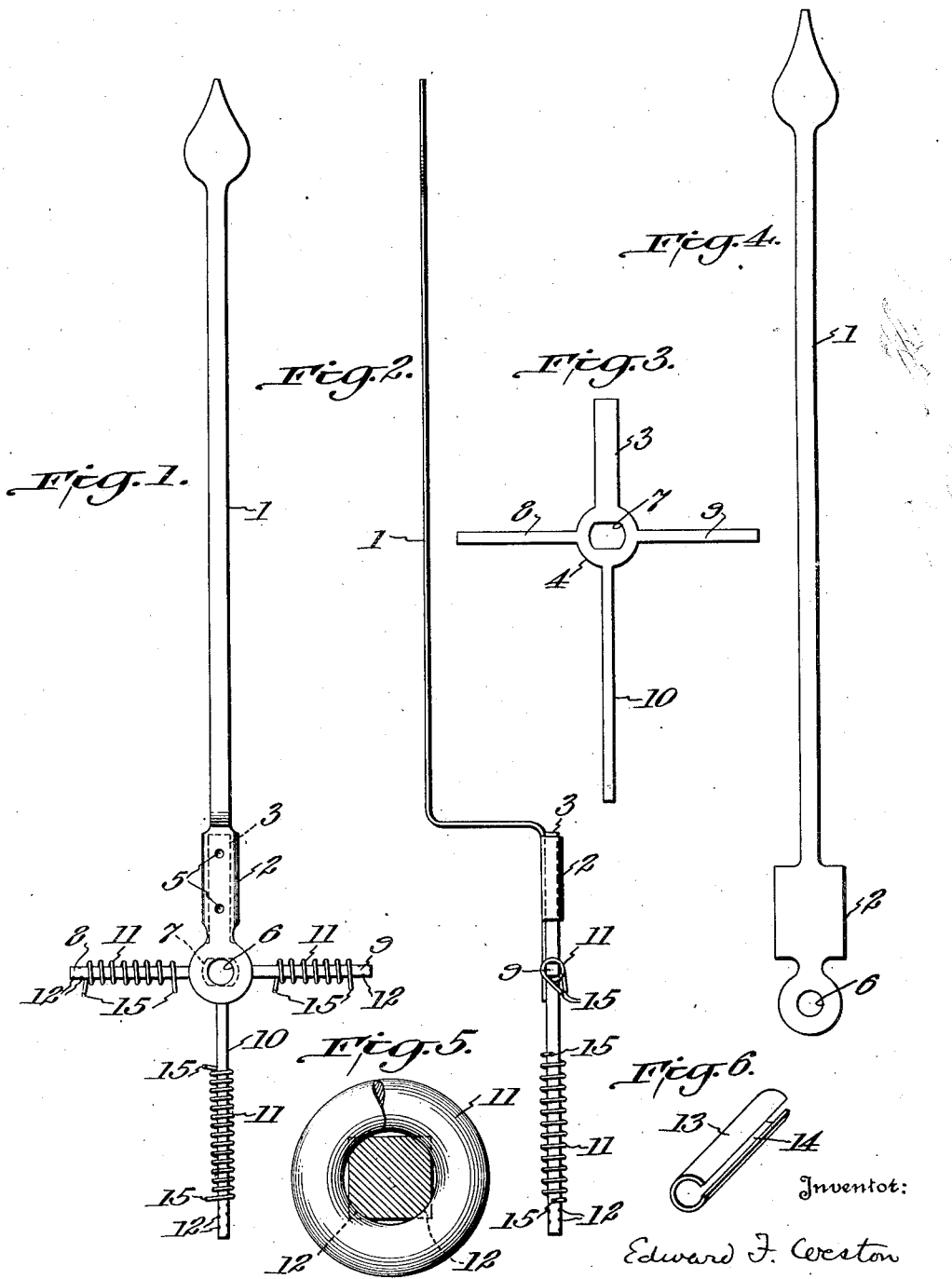

Patented Apr. 6, 1926.

1,579,849

UNITED STATES PATENT OFFICE.

EDWARD F. WESTON, OF NEWARK, NEW JERSEY, ASSIGNOR TO WESTON ELECTRICAL INSTRUMENT CORPORATION, OF NEWARK, NEW JERSEY, A CORPORATION OF NEW JERSEY.

POINTER FOR ELECTRICAL MEASURING INSTRUMENTS.

Application filed June 26, 1925. Serial No. 39,825.

*To all whom it may concern:*

Be it known that I, EDWARD F. WESTON, a citizen of the United States, residing at Newark, in the county of Essex and State of New Jersey, have invented certain new and useful Improvements in Pointers for Electrical Measuring Instruments, of which the following is a specification.

My invention relates to electrical measuring instruments and particularly to a pointer therefor, and to means for constructing such pointers.

In the manufacture of balancing devices for such pointers it has heretofore been necessary that very minute parts should be accurately machined. For instance, an accurate thread had to be cut in a minute nut and on a corresponding stud. Such operations involved delicate machinery and expensive labor. My invention obviates these difficulties by doing away with the necessity for such delicate machine work.

Helical springs have heretofore been used as balance weights, but on cylindrical balance members along which they could be slid or pushed.

According to this invention, helical springs are screwed on to balance members of polygonal cross-section.

Referring to the drawings, Fig. 1 is a plan view, and Fig. 2 is a side view, of my assembled pointer. Fig. 3 is the balancing cross and Fig. 4 is the indicating needle. Fig. 5 is a magnified (about 50 times) cross-section of one arm of the balancing cross with one of the helical balancing weights in place, while Fig. 6 shows the tool which is employed for positioning the helical weights upon the balancing cross.

The indicating needle 1 may be stamped from aluminum or other suitable sheet metal and has near its lower end a broad portion 2 which is adapted to be wrapped tightly about the arm 3 of the balancing cross 4. To insure a rigid assembly the indicating needle is staked to the arm 3, as shown at 5. The indicating needle has a hole 6 in its lower end, adapted to coincide with a hole 7 at the intersection of the arms of the balancing cross, thereby affording a means for mounting or supporting the assembled pointer on its pivot to which it is eventually secured by a nut.

The balancing cross 4 may be made of brass or other suitable relatively soft metal. The three balancing arms 8, 9 and 10 are polygonal, preferably square, in cross-section. Upon these three arms I place balancing weights 11, in the form of helical springs which may be made of some metal harder than that of the balancing cross, as for instance phosphor bronze. The interior diameter of the helical springs, in their normal or unstressed condition, is less than the diagonal of the polygonal arms, and the coils are therefore expanded in positioning them upon the polygonal arms. When they are screwed on over the polygonal arms, they closely embrace the arms and remain in their adjusted position. When made of sufficiently hard metal, the helical springs will cut their own threads on the corners of the arms.

Because of the tendency of the coils to bind when twisted, I employ the tool shown in Fig. 6 for holding the coil and screwing it into place. This tool consists of a sleeve 13 having a slot 14. In order that this slot may engage the coils, I provide each coil with a projecting portion 15 at each end.

It is to be understood that the balancing weights may be so adjusted upon the arms of the cross that the assembled pointer is suitably balanced and that this adjustment is accomplished by screwing the weights toward or away from the ends of the arms of the balancing cross.

While in the particular construction shown a balancing cross having several arms is shown, my invention is obviously applicable to a single arm or end of the pointer.

So also, while I prefer to make the balancing cross of softer metal and the spring of harder metal, this relation is not essential as the springs even if made of metal not harder than the arm of the pointer, will hold themselves in place without other holding means.

I claim:

1. A pointer for electrical measuring instruments having a portion thereof polygonal in cross-section and a balancing weight thereon in the form of a helical coil embracing said portion, the normal internal diameter of said coil being less than the diagonal of the polygonal portion.

2. A pointer as claimed in claim 1 in which the coil is positioned on the pointer by means of threads which the coil itself has cut.

3. An indicating needle of the type comprising a balance arm and a balance weight thereon, characterized by the fact that the balance weight is a helical spring secured to the arm by threads which the spring cuts as it is turned upon the arm.

4. A pointer assembly for an indicating instrument comprising a sheet metal indicating needle having a pointer and a pivot-receiving opening at the opposite ends thereof, the portion of said needle adjacent said opening being of enlarged width, and a balance cross, the enlarged portion of said needle being tightly wrapped about and staked to one arm of said cross.

In testimony whereof, I affix my signature.

EDWARD F. WESTON.